United States Patent
Gururaj et al.

(10) Patent No.: US 10,949,183 B2
(45) Date of Patent: Mar. 16, 2021

(54) SYSTEM AND METHOD FOR TRANSFORMING CO-ROUTINES TO EQUIVALENT SUB-ROUTINES

(71) Applicant: VAYAVYA LABS PRIVATE LIMITED, Bangalore (IN)

(72) Inventors: Karthick Gururaj, Bangalore (IN); Sandeep Pendharkar, Bangalore (IN); Venugopal Kolathur, Belagavi (IN); Sangamesh O Shetty, Belagavi (IN)

(73) Assignee: VAYAVYA LABS PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/703,818

(22) Filed: Dec. 4, 2019

(65) Prior Publication Data

US 2020/0183671 A1 Jun. 11, 2020

(30) Foreign Application Priority Data

Dec. 5, 2018 (IN) .............................. 201841046016

(51) Int. Cl.
*G06F 9/45* (2006.01)
*G06F 8/51* (2018.01)
(Continued)

(52) U.S. Cl.
CPC ................ *G06F 8/51* (2013.01); *G06F 8/457* (2013.01); *G06F 8/76* (2013.01); *G06F 9/4881* (2013.01)

(58) Field of Classification Search
CPC ... G06F 8/51; G06F 8/457; G06F 8/76; G06F 9/4881; G06F 8/40; G06F 8/41
(Continued)

(56) References Cited

U.S. PATENT DOCUMENTS

2011/0191445 A1* 8/2011 Dazzi ...................... G06F 15/16
709/219
2013/0054908 A1* 2/2013 Gehani ............... G06F 11/1438
711/161

(Continued)

OTHER PUBLICATIONS

Title: A view of coroutines ; author: D Grune published on 1977.*
Title: Bidirectional coroutines ; author: H Samet Published on 1985.*

*Primary Examiner* — Chameli Das

(57) ABSTRACT

A processor-implemented method for transforming co-routines to equivalent sub-routines is provided. An input is received at a first user device from a user for a first language and a first operating environment. The first language includes the co-routines and is supported in a first hardware environment. The first language is analyzed to transform the co-routines of the first language into the sub-routines of a second language for implementing the co-routines of the first language in a second hardware environment. The second hardware environment supports the sub-routines of the second language in a second operating environment by determining automatic variables for persistent variables and non-persistent variables, transforming the persistent variables and the non-persistent variables into the sub-routines of the second language, determining return statements and yield statements in the co-routines, and translating the co-routines of the first language into the sub-routines of the second language and the second operating environment.

18 Claims, 8 Drawing Sheets

(51) Int. Cl.
*G06F 8/76* (2018.01)
*G06F 8/41* (2018.01)
*G06F 9/48* (2006.01)

(58) Field of Classification Search
USPC .......................................................... 717/137
See application file for complete search history.

(56) References Cited

U.S. PATENT DOCUMENTS

2013/0227533 A1* 8/2013 Tonkin ...................... G06F 8/51
717/137
2014/0189663 A1* 7/2014 Guenthner .............. G06F 8/456
717/146

* cited by examiner

SYSTEM AND METHOD FOR TRANSFORMING CO-ROUTINES TO EQUIVALENT SUB-ROUTINES

CROSS-REFERENCE TO RELATED APPLICATIONS

This patent application claims priority to Indian provisional patent application no. 201841046016 filed on Dec. 5, 2018, the complete disclosures of which, in their entireties, are hereby incorporated by reference.

BACKGROUND

Technical Field

The embodiments herein generally relate to a field of computer technologies, and more particularly, to a system and method for transforming co-routines to equivalent sub-routines.

Description of the Related Art

A sequence of operation is one of the most important design aspects of any system. Without a proper sequence, the system is left to operate wildly or not at all. When approached methodically, the process may be broken into smaller segments. A sequence of operations in a sub-routine procedure may include statements such as (i) a declaration of variables of language native types or user-defined types, (ii) expressions involving variables using operators and assignment of such expressions to other variables, (iii) conditional statements and branches like if-else statements, switch-case statements, (iv) loop statements such as for-loop or do-while loop, (v) calls to other functions or procedures and (vi) single entry point and possibly multiple exit point.

A co-routine is a generalization of a sub-routine, which includes in addition multiple entry points for suspending and resuming execution. The co-routine achieves this by having one or more "yield" statements for yielding control until a specified event occurs or time passes. When the co-routine resumes execution, it starts from the statement after the yield. The yield statement can be present directly in the co-routine procedure or can be present in another procedure that is invoked directly or indirectly from the co-routine. Expressing behavior using such co-routine semantics is very convenient for the cases where the execution needs to wait for events that are triggered external to the behavior. However, co-routine semantics may not be supported in certain environments or may not be allowed for other reasons. In such cases, user needs to partition the behavior manually and synchronize between the various sub-routines.

FIG. 1 is a block diagram of a first user device 102 and a second user device 104 according to some embodiments herein. The block diagram 100 includes the first user device 102 and the second user device 104. The first user device 102 includes a first hardware environment 106, a first operating environment 108, and co-routines 110. The second user device 104 includes a second hardware environment 112, a second operating environment 114, and sub-routines 116. The first hardware environment 106 together with the first operating environment 108 supports an implementation of the co-routines 110. The second hardware environment 112 together with the second operating environment 114 only supports an implementation of the sub-routines 116. If a user wants to implement the co-routines 110 of the first language in the second language then the co-routines 110 are not supported in the second hardware environment 106. Accordingly, there remains a need for a system and method for transforming co-routines to equivalent sub-routines.

SUMMARY

In view of the foregoing, embodiments herein provide a processor-implemented method for transforming co-routines to equivalent sub-routines. The method includes (i) receiving, at a first user device, an input from a user for a first language and a first operating environment. The first language includes co-routines. The first language is supported in a first hardware environment. (ii) analyzing, by a source to source transformation module, the first language to transform the co-routines of the first language into sub-routines of a second language for implementing the co-routines of the first language in a second hardware environment, wherein the second hardware environment supports the sub-routines of the second language in a second operating environment by (a) determining at least one automatic variable for persistent variables and non-persistent variables across suspend cycles or resume cycles of the co-routines of the first language, (b) transforming the persistent variables and the non-persistent variables into automatic variable the sub-routines of the second language based on determined at least one automatic variable, (c) determining return statements and yield statements in the co-routines of the first language for transforming the return statements into return statements of the sub-routines of the second language, and (d) translating the co-routines of the first language into the sub-routines of the second language and the second operating environment.

In some embodiments, the co-routines of the first language is translated into the sub-routines of the second language using at least one of (i) the persistent variables, (ii) the non-persistent variables, (iii) the return statements, or (iv) the yield statements of the co-routines.

In some embodiments, the first language is a first set of instructions that generates at least one first output and the first operating environment.

In some embodiments, the sub-routine is declared globally in the second language.

In some embodiments, the yield statements in the co-routines are directly or indirectly inside a loop or condition.

In some embodiments, the second language is a second set of instructions that generates at least one second output and the second operating environment.

In some embodiments, the co-routines with the return statements includes output arguments.

In some embodiments, the method includes providing an access of the persistent variables and the non-persistent variables to the automatic variables of the sub-routines of the second language.

In some embodiments, the method includes generating status and return values for each subroutine of the second language.

In some embodiments, the method includes storing the at least one automatic variable in a database or a file for using in the sub-routines.

In another aspect, a system for transforming co-routines to equivalent sub-routines is provided. The system includes one or more processors, a source and source transformation module, and one or more non-transitory computer-readable mediums storing one or more sequences of instructions, which when executed by the one or more processors, cause: (i) receive, at a first user device, an input from a user for a first language and a first operating environment. The first language includes co-routines, and (ii) analyze, by the source and source transformation module, the first language to transform the co-routines of the first language into sub-routines of a second language for implementing the co-routines of the first language in a second hardware environment, wherein the second hardware environment supports the sub-routines of the second language in a second operating environment cause (a) determine at least one automatic variable for persistent variables and non-persistent variables across suspend cycles or resume cycles of the co-routines of the first language, (b) transform the persistent variables and the non-persistent variables into automatic variables of the sub-routines of the second language based on determined at least one automatic variable, (c) determining return statements and yield statements in the co-routines of the first language for transforming the return statements into return statements of the sub-routines of the second language, and (d) translating the co-routines of the first language into the sub-routines of the second language and the second operating environment.

In some embodiments, the co-routines of the first language are translated into the sub-routines of the second language using at least one of (i) the persistent variables, (ii) the non-persistent variables, (iii) the return statements, and (iv) the yield statements of the co-routines.

In some embodiments, the first language is a first set of instructions that generates at least one first output and the first operating environment.

In some embodiments, the sub-routine is declared globally in the second language.

In some embodiments, the yield statements in the co-routines are directly or indirectly inside a loop or condition.

In some embodiments, the instructions cause the one or more processors to provide an access of the persistent variables and the non-persistent variables to the automatic variables of the sub-routines of the second language.

In some embodiments, the instructions cause the one or more processors to generate status and return values for each subroutine of the second language.

In some embodiments, the instructions cause the one or more processors to store the at least one automatic variable in a database or a file for using in the sub-routines.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
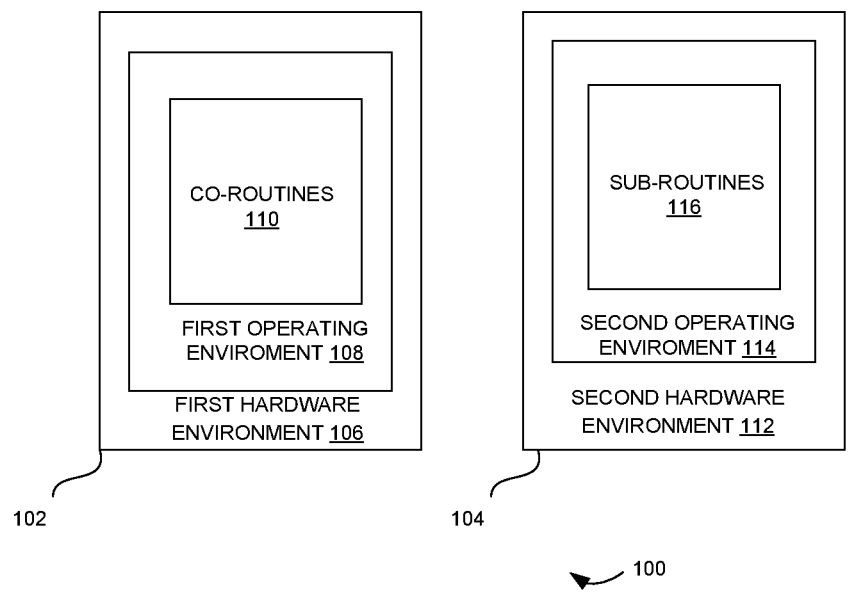
FIG. 1 is a block diagram of a first user device and a second user device according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for transforming co-routines to equivalent sub-routines. The embodiments herein achieve this by allowing a user to use co-routine semantics for describing a behaviour, while still being able to address cases where co-routines are not supported or supported but have other disadvantages such as embedded systems and hardware modelling languages. Referring now to the drawings, and more particularly to FIGS. 1 through 8, where similar reference characters denote corresponding features consistently throughout the figures, there are shown preferred embodiments.

Figure 2:
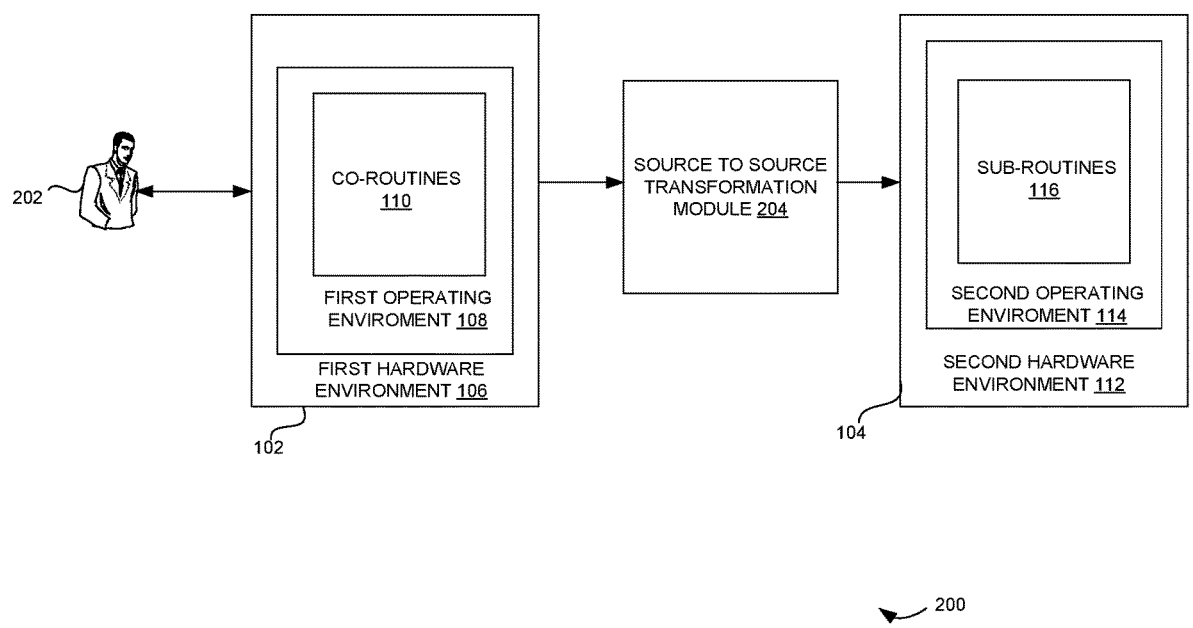
FIG. 2 is a block diagram of a system for transforming co-routines to equivalent sub-routines according to some embodiments herein.

FIG. 2 is a block diagram 200 of a system for transforming co-routines to equivalent sub-routines according to some embodiments herein. The block diagram 200 includes a user 202, a first user device 102, a second user device 104, a first hardware environment 106, a first operating environment 108, co-routines 110, a source to source transformation module 204, a second hardware environment 112, a second operating environment 114, and sub-routines 116. In some embodiments, the first user device 102 and the second user device 104, without limitation, may be a computer. In some embodiments, the first user device 102 includes the source to source transformation module 204. In some embodiments, the second user device 104 includes the source to source transformation module 204. In some embodiments, a server or a computing device includes the source to source transformation module 204. The first user device 102 and the second user device 104 includes a memory that stores a set of instructions and a processor that executes the set of instructions and is configured to (i) receive, at the first user device 102 an input from the user 202 in a first language and the first operating environment 108. The first language includes the co-routines 110. The first language is supported in the first hardware environment 106, and (ii) analyze, by the source to source transformation module 204, the first language to transform the co-routines 110 of the first language into sub-routines 116 of a second language for implementing the co-routines 110 of the first language in the second hardware environment 112. The second hardware environment 112 supports the sub-routines 116 of the second language in the second operating environment 114 by (a) determining at least one automatic variable for persistent variables and non-persistent variables across suspend cycles or resume cycles of the co-routines 110 of the first language, (b) transforming the persistent variables and the non-persistent variables into automatic variables of the sub-routines 116 of the second language based on determined at least one automatic variable, (c) determining return statements and yield statements in the co-routines 110 of the first language for transforming the return statements and the yield statements into return statements of the sub-routines 116 of the second language, and (d) translating the co-routines 110 of the first language into the sub-routines 116 of the second language and the second operating environment 114 by executing a set of sub-routines in the co-routines 110 of the first language.

In some embodiments, the source to source transformation unit 204 accepts a file implemented in at least one language as an input and generates an equivalent implementation in another language as an output. In some embodiments, the source to source transformation unit 204 generates the equivalent implementation that is same as the at least one language. In some embodiments, the source to source transformation unit 204 obtains the first language as an input to generate the equivalent implementation in the second language as an output. In some embodiments, the first language includes co-routines 110 and the second language includes the sub-routines 116. In some embodiments, the first and the second languages are well-known languages such as Python, C/C++, JavaScript, XML, or even a proprietary language. In some embodiments, the languages are general purpose programming languages or a DSL (Domain Specific Language). In some embodiments, the operating environment 108 may be Operating Systems (OS) such as Linux, apple IOS. In some embodiments, the hardware environment maybe a general-purpose computer or a specialized hardware system. In some embodiments, the hardware environment can be implemented with prototyping technologies like FPGA or In-circuit emulator. In some embodiments, the hardware environment can be virtualized.

In some embodiments, the source to source transformation unit 204 translates a co-routine procedure given as the input into one language such as Python, C/C++, JavaScript, XML or even a proprietary language and an operating environment such as Linux or SystemC using yield statements. The one language such as Python, C/C++, JavaScript, XML or even a proprietary language and the first operating environment 108 such as Linux or SystemC are transformed into a set of sub-routines in the second language for a possible same or different second operating environment 114.

In some embodiments, function names that start with "co_" are the co-routines 110 and have the yield statements. In some embodiments, function names that start with "sub_" are the sub-routines 116 and may not have the yield statements. In some embodiments, object names that start with "ev_" denote one or more events. In some embodiments, the one or more events may be combined in an event expression using operators such as AND or OR. The co-routines 110 may wait for an event until the co-routines 110 get notified as described below. In some embodiments, the event may be notified in other co-routines or the sub-routines 116. In some embodiments, the co-routines 110 includes a single master co-routine which is called a "co_scheduler".

In some embodiments, an automatic variable is a variable whose scope is defined within a block of code. The sub-routines 116 are a block of code that accepts variables as input arguments and performs some specific operations to provide an output of the operation as one or more results. The output may be provided as output arguments or as return values. The co-routines 110 are a generalization of the sub-routines 116 including one or more entry points for suspending and resuming execution. In some embodiments, the input arguments are the inputs provided to the sub-routines 116 to perform an operation on the sub-routines 116. In some embodiments, the output arguments are results of the specific operations carried out by the sub-routines 116. The return values may represent an intended result of the sub-routines 116. The return values may be only one return value for some programming languages, e.g. C/C++ or may be multiple return values for some programming languages, e.g. Python.

In some embodiments, a Listing 1 is disclosed, consider a C language for illustrating a solution with code listings.

Listing 1: The co-routine

```
return_type_t co_function0(arg_type1_t arg1, arg_type2_t arg2)
{
    arg1 = sub_function0(arg1, arg2);
    wait(ev_Event);
    return sub_function1(arg1);
}
```

In some embodiments, the co-routines 110 yield to the co_scheduler by calling a wait ( . . . ) function causing a yielding co-routine to suspend until a specified event occurs. The co_scheduler may yield to each other co-routine causing it to resume execution when at least one of the event or an event expression is notified. The wait ( . . . ) function may take at least one of the event or the event expression as an argument. The sub-routines 116 may be registered to trigger on at least one of a specified event or the event expression using a "trigger_on( . . . )" function. The co_scheduler may call such sub-routines 116 when at least one of the event or the event expression is notified. The trigger_on ( . . . ) function may take the event or the event expression, the sub-routines 116 and any sub-routine parameters as the arguments.

Figure 3:
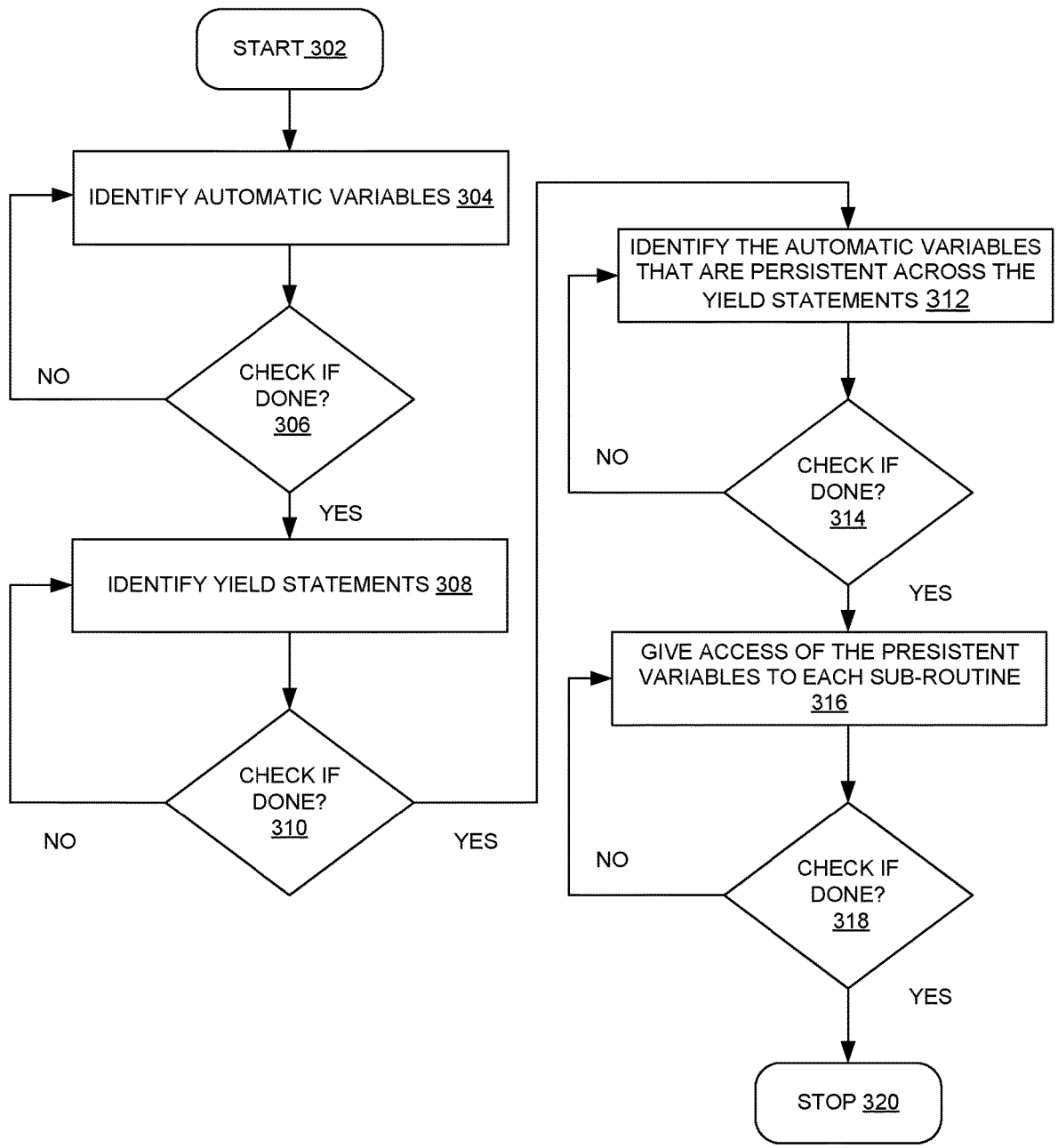
FIG. 3 is a flow chart that illustrates a method for transforming co-routines with persistent and non-persistent variables into sub-routines according to some embodiments herein.

FIG. 3 is a flow chart that illustrates a method 300 for transforming the co-routines 110 with persistent and non-persistent variables into the sub-routines 116 according to some embodiments herein. At step 302, the method 300 includes starting a process of transforming the co-routines 110 with the persistent and the non-persistent variables into the sub-routines 116. At step 304, the method 300 identifying automatic variables by analyzing words such as wait, return and like in the co-routines 110. At step 306, the method 300 includes checking if the automatic variables are identified if yes goes to step 308 else continue the step 304. At step 308, the method 300 includes identifying yield statements by analyzing words such as wait, return and the like in the co-routines 110. At step 310, the method 300 includes checking if the yield statements are identified if yes goes to step 312 else continue the step 308. At step 312, the method 300 includes identifying the automatic variables that are persistent across the yield statements. At step 314, the method 300 includes checking if all the automatic variables are the persistent across the yield statements if yes goes to step 316 else continue the step 312. At step 316, the method 300 includes giving access of the persistent variables to each sub-routine. At step 318, the method 300 includes checking if the persistent variable is given access to each subroutine then goes to step 320 else continue the step 316. At step 320, the method 300 includes stopping the process of transforming the co-routines 110 with the persistent and the non-persistent variables into the sub-routines 116.

In some embodiments, a Listing 2 is disclosed, consider a use of at least one automatic variable also called as a local variable in a co-routine cross a point where the co-routine yields. In some embodiments, the at least one automatic variable may be saved when the co-routine yields and restored when the co-routine resumes execution. The at least one automatic variable which is stored is called as a "persistent variables" herein. The persistent variables may be grouped in classes or structures or handled individually.

Listing 2: co-routine with the persistent and non-persistent variables

```
void co_function0( )
{
    int i = 0;
    int j = 0;
    int k;
    for(i=0; i<10; i++)            // (1)
    {   // (1)
        sub_functionA( );
    }
    j = sub_functionB( );          // (2)
    wait(ev_ready);                // (3)
    sub_functionC(j);              // (4)
    k = j + 10;                    // (5)
    sub_functionC(k);              // (6)
}
```

In some embodiments, the Listing 2 includes a variable "i". The variable "i" is used only in loop (1). The variable "i" is not used after a yield "the wait statement" at (3). In some embodiments, the variable "i" is categorized as the non-persistent variable. In some embodiments, a variable "k" is only used after yield at (5) and (6)—hence the variable "k" is also categorized as the non-persistent variable. In some embodiments, a variable "j" is used before (2) and after the yield (4), hence the variable "j" is categorized as the persistent variable.

In some embodiments, a Listing 3, a Listing 4, and a Listing 5 is disclosed, three ways to transform a persistent variable "j" as shown in the Listing 2 co-routine with persistent and non-persistent variables. In some embodiments, the listing 3 uses an output argument, j_ptr, the Listing 4 uses a global variable j_global, and the listing 5 invokes another sub-routine sub_save(j) that may save the value of "j".

Listing 3: Handling Persistent Variables:

```
int sub_function0(int *j_ptr)
{
    int i = 0;
    *j_ptr = 0;
    for(i=0; i<10; i++)
    {
        sub_functionA( );
    }
    *j_ptr = sub_functionB( );
}
```

Listing 4: Handling Persistent Variables:

```
int j_global = 0;
int sub_function0( )
{
    int i = 0;
    j_global = 0;
    for(i=0; i<10; i++) {
        sub_functionA( );
    }
    j_global = sub_functionB( );
}
```

Listing 5: Handling Persistent Variables:

```
void sub_function0( )
{
    int i = 0;
    int j = 0;
    for(i=0; i<10; i++)
    {
        sub_functionA( );
    }
    j = sub_functionB( );
    sub_save(j);
}
```

In some embodiments, the source to source transformation unit 204 analyzes the co-routines 110 and identifies the variables whose value needs to persist across suspend or resume cycles. In some embodiments, a simple analysis may be possibly to decide that the at least one automatic variable needs to be persisted. In some embodiments, the translated sub-routine, such variables that need to persist are in a combination. The combination includes (i) declared as sub-routine output arguments or return value, or (ii) declared in a parent scope, possibly global, or (iii) include the translated sub-routine lifetime extended beyond the time the sub-routine returns by employing other language-specific constructs such as declaring the variable as "static" inside a function in C, or (iv) include the translated sub-routine lifetime extended beyond the time the sub-routine returns by employing other output environment-specific constructs such as storing the variables in a database or a file, or (v) pass the variable to another sub-routines that performs any of the options in the listings.

Figure 4:
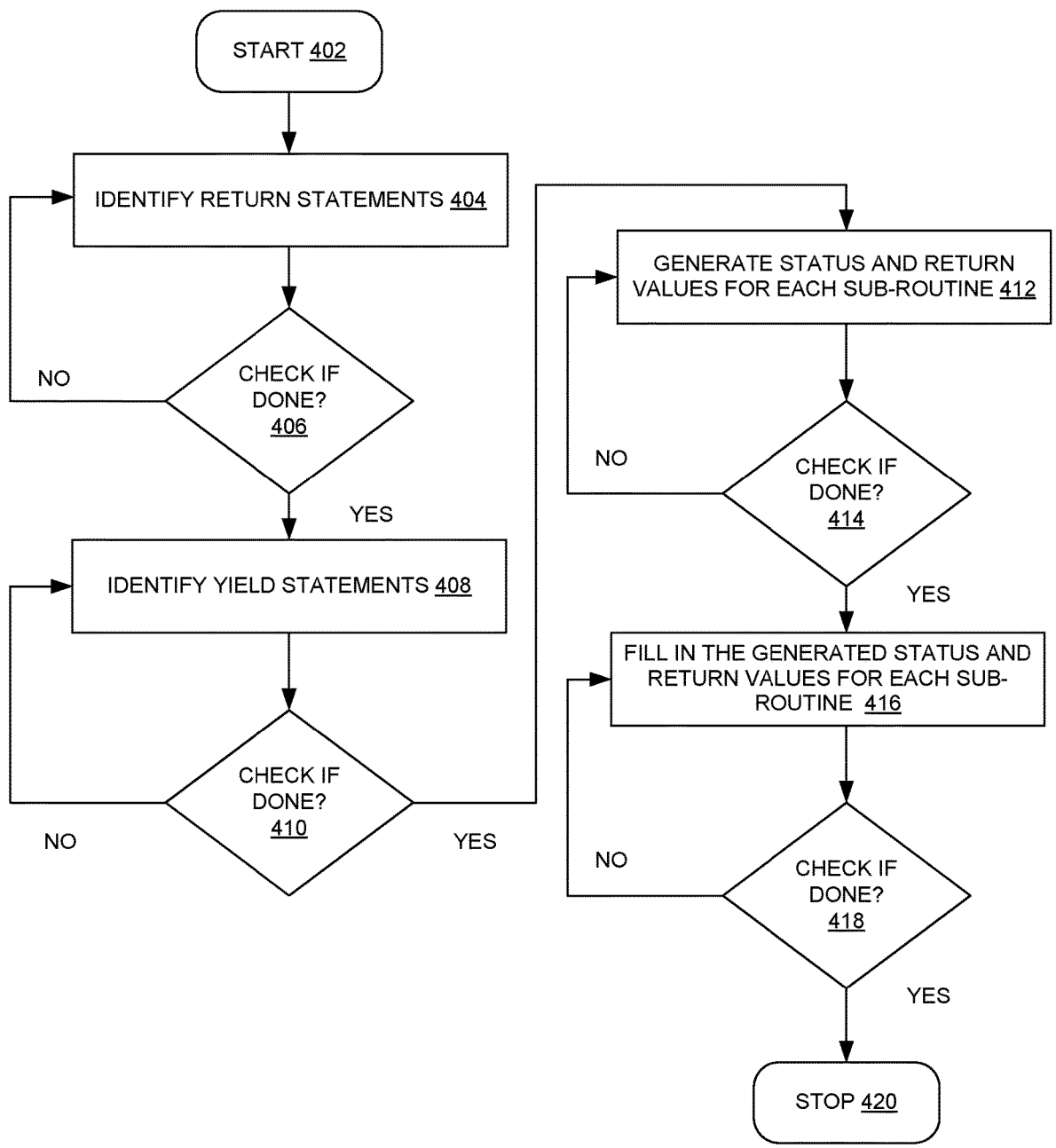
FIG. 4 is a flow chart that illustrates a method for transforming co-routines with return statements into sub-routines according to some embodiments herein.

FIG. 4 is a flow chart that illustrates a method 400 for transforming the co-routines 110 with return statements into the sub-routines 116 according to some embodiments herein. At step 402, the method 400 includes starting a process of transforming the co-routines 110 with return into the sub-routines 116. At step 404, the method 400 includes identifying return statements. At step 406, the method 400 includes checking if the return statements are identified if yes goes to step 408 else continue the step 404. At step 408, the method 400 includes identifying yield statement. At step 410, the method 400 includes checking if the yield statements are identified if yes goes to step 412 else continue the step 408. At step 412, the method 400 includes generating status and return values for each sub-routine. At step 414, the method 400 includes checking if the status and return values for each subroutine are generated if yes goes to step 416 else continue the step 412. At step 416, the method 400 includes filling the generated status and return values for each sub-routine. At step 418, the method 400 includes checking if the status and return values for each subroutine is filled if yes goes to step 420 else continue the step 416. At step 420, the method 400 includes stopping the process of transforming a co-routine with return statements into sub-routine.

In some embodiments, the sub-routines 116 and the co-routines 110 may return, with or without values. In some embodiments, as per a language semantics, the return might be explicit, for e.g., using the "return" keyword in C or implicit, for e.g., a function returns after executing the last statement in C. The co-routines 110 may include at least one return statements.

In some embodiments, a Listing 6 is disclosed, consider a co_function0 with various return points at (1), (2) and (3), where (3) is an implicit return. co_function1 is similar, but includes a return value of value '0' at (1), '1' at (2) and '2' at (3). In some embodiments, a co_function2 is similar to the co_function1, but also sets additional return values in 'clout' output argument.

Listing 6: Co-routine with return

```
void co_function0(int x)
{
    if (x == 0)
    {
        return;                      // (1)
    }
    else if (x == 1)
    {
        wait(ev_Event0);
        return;                      // (2)
    } else
    {
        wait(ev_Event1);
    }                                // (3)
}
int co_function1(int x)
{
    if(x == 0) {
        return 0;                    // (1)
    } else if (x == 1) {
        wait(ev_Event0);
        return 1;                    // (2)
    } else {
        wait(ev_Event1);
    }
    return 2;                        // (3)
}
struct my_data_t { int i; int j };
int co_function2(int x, my_data_t *dout)
{
    if (x == 0) {
        dout->i = 1; dout->j = 2;
        return 0;                    // (1)
    } else if (x == 1) {
        wait(ev_Event0);
        dout->i = 2; dout->j = 3;
        return 1;                    // (2)
    } else {
        wait(ev_Event1);
    }
    dout->i = 3; dout->j = 4;
    return 2;                        // (3)
}
```

In some embodiments, the co-routines 110 may also return values through co-routine output arguments, or by setting a variable declared as in the parent scope, or by employing other output environment-specific constructs such as storing the variables in a database or a file, or passing the values to another sub-routines that does any of the options in the listing 6.

In some embodiments, the transformed sub-routine outputs a status on whether the return value is available when the sub-routines 116 completes or whether the return value is not yet available. In some embodiments, the sub-routines 116 may output a part of the sub-routine's output arguments or return value, or by setting a variable declared as in a parent scope, or by employing other output environment-specific constructs such as storing the variables in a database or a file, or passing the status to another sub-routines that does any of the options in the listing 6.

In some embodiments, the original return values, when available, may be returned through a callback function. The original return values may be provided directly as an argument to the sub-routine or separately, or by calling a function in a parent scope, or by notifying an event by setting variable declared as in a parent scope, or by employing other output environment-specific constructs such as storing the variables in a database or a file, or passing the values to another sub-routines that accepts transformation.

In some embodiments, the status and return values may be returned as a part of a single class or a structure or individually.

In some embodiments, a Listing 7 is disclosed, consider one possible way to translate the co-routine with return of Listing 6.

Listing 7: Handling co-routine return statements

```
enum status_t {DONE, DEFERRED};
typedef void (*callback_t)(void);
status_t sub_function0(int x, callback_t fn)
{
    if (x == 0){
        fn( );
        return DONE;                 // (1)
    } else if (x == 1) {
        return DEFERRED;             // (2)
    } else {
    }
    return DEFERRED;                 // (3)
}
enum status_t {DONE, DEFERRED};
void return_value(int value);
void sub_function1(int x, status_t *ptr)
{
    if (x == 0) {
        *ptr = DONE;
        return_value(0);
        return;                      // (1)
    } else if (x == 1) {
        *ptr = DEFERRED;
        return;                      // (2)
    } else {
    }
    *ptr = DEFERRED;
    return;                          // (3)
}
enum status_t {DONE, DEFERRED};
struct my_data_t { int i; int j };
struct return_struct_t {
    status_t status;
    my_data_t dout;
    int val;
};
void sub_function2(int x, return_struct_t *pdata)
{
```

Listing 7: Handling co-routine return statements

```
if (x == 0) {
   pdata->status = DONE;
   pdata->dout.i = 1; pdata->dout.j = 2;
   pdata->val = 0;
   return;                              // (1)
} else if (x == 1) {
   pdata->status = DEFERRED;
   return;                              // (2)
} else {
}
pdata->status = DEFERRED;
return;                                 // (3)
}
```

In some embodiments, the output sub-routine functions include (i) Sub_function0 provides the status as a return value of the function itself. Further, it accepts a callback function as an argument, (ii) sub_function1 provides the status in the output variable "ptr" and calls the global function "return value ( . . . )" to provide the return value of the co-routine, and (iii) sub_function2 provides the status and the return values in the single output variable "pdata".

Figure 5:
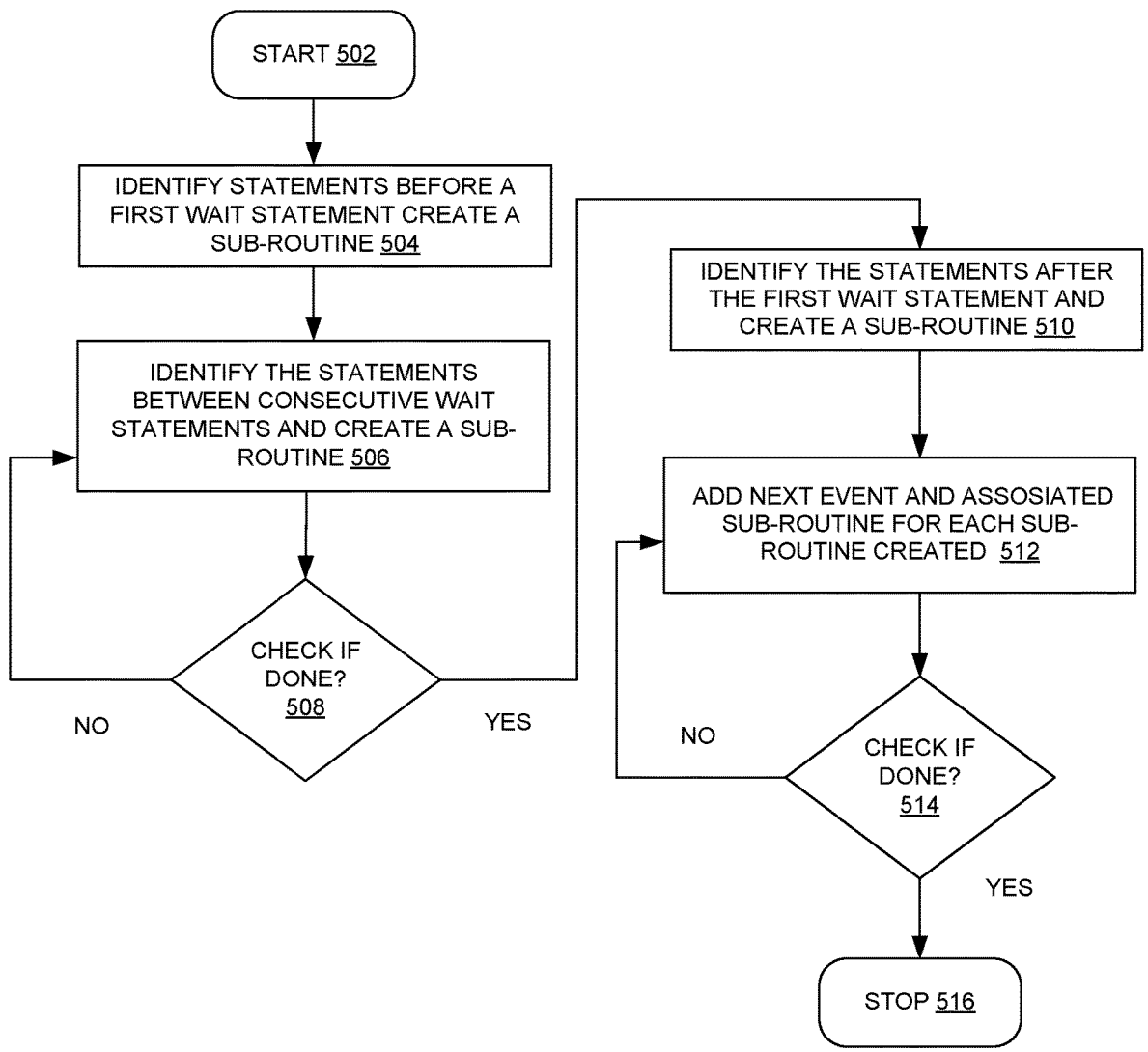
FIG. 5 is a flow chart that illustrates a method for transforming co-routines with simple yields into sub-routines according to some embodiments herein.

FIG. 5 is a flow chart that illustrates a method 500 for transforming the co-routines 110 with simple yields into the sub-routines 116 according to some embodiments herein. At step 502, the method 500 includes starting a process of transforming the co-routines 110 with simple yields into the sub-routines 116. At step 504, the method 500 includes identifying statements before a first wait statement and creates the subroutines 116. At step 506, the method 500 includes identifying the subroutines 116 between consecutive wait statements and creating the subroutines 116. At step 508, the method 500 includes checking if the subroutines 116 are created if yes goes to step 510 else continue the step 506. At step 510, the method 500 includes identifying the statements after the first wait statement and creating the subroutines 116. At step 512, the method 500 includes adding the next event and associated subroutine for each subroutine created. At step 514, the method 500 includes checking if the next event and associated subroutine is added if yes goes to step 516 else continue the step 512. At step 516, the method 500 includes stopping the process of transforming the co-routines 110 with simple yields into the sub-routines 116.

In some embodiments, the co-routines 110 may have yield statements (wait ( . . . )) in different scenarios. The "wait ( . . . )" is present in a body of the co-routines 110 directly and indirectly inside a loop or conditional. A co-routine may include multiple such wait statements.

In some embodiments, a Listing 8 is disclosed. The listing 8 shows a co-routine with two wait statements (at (3) and (6)).

Listing 8: Co-routine with simple yields

```
void co_function0(void)
{
   int i = 0;                           // (1)
   i = sub_functionA(i);
   i++;                                 // (2)
   wait(ev_Event0);                     // (3)
   i = sub_functionB(i);                // (4)
   i++;                                 // (5)
   wait(ev_Event1);                     // (6)
   if(i>20) {                           // (7)
      i++;
```

Listing 8: Co-routine with simple yields

```
   }
   i = sub_functionC(i);                // (8)
}
```

In some embodiments, the wait statements partition the co-routines 110 into three parts. The three parts include a first segment, from (1) to (2), a second segment, from (4) to (5) and a third segment, from (7) to (9)

In some embodiments, a Listing 9 and a Listing 10 is disclosed.

Listing 9: Handling simple yields

```
status_t sub_function0(void)
{
   int i = 0;                                          // (1)
   i = sub_functionA(i);
   i++;                                                // (2)
   trigger_on(ev_Event0, sub_function1, i);            // (3)
   return DEFFERED;
}
status_t sub_function1(int i)
{
   i = sub_functionB(i);                               // (4)
   i++;                                                // (5)
   trigger_on(ev_Event1, sub_function2, i);            // (6)
   return DEFFERED;
}
status_t sub_function2(int i)
{
   if(i>20) {                                          // (7)
      i++;
   }
   i = sub_functionC(i);                               // (8)
   return_value( );
   return DONE;                                        // (9)
}
```

Listing 10: Handling simple yields

```
status_t sub_function0(int i)
{
   switch(state) {
   case 0:
      {
         i = 0;                                        // (1)
         i = sub_functionA(i);
         i++;                                          // (2)
         trigger_on(ev_Event0, sub_function0, i);      // (3)
         state = 1;
         return DEFFERED;
      }
      break;
   case 1:
      {
         i = sub_functionB(i);                         // (4)
         i++;                                          // (5)
         trigger_on(ev_Event1, sub_function0, i);      // (6)
         state = 2;
         return DEFFERED;
      }
      break;
   case 2:
      {
         if(i>20) {                                    // (7)
            i++;
         }
         i = sub_functionC(i);                         // (8)
         return_value( );
         return DONE;                                  // (9)
      }
}
```

Listing 10: Handling simple yields

```
        break;
    }
}
```

In some embodiments, the Listing 9 identifies if there are any statements before the first yield statement and then creates a sub-routine with the statements that have been identified. The Listing 10 identifies the statements that are between two yield statements and then creates the sub-routine with the statements that have been identified. In some embodiments, the step of Listing 10 is repeated if there are more than two waits statements in the co-routines 110. In some embodiments, the Listing 9 and Listing 10 identifies if there are any statements after the last yield statement and creates the sub-routines 116 with the statements that have been identified. For each yield statement, register the associated sub-routine to trigger at least one of the event or the event expression by notifying.

In some embodiments, the Listing 9 and Listing 10 includes at least two possible ways to translate the Listing 8 Co-routine with simple yields. In some embodiments, the Listing 9 functionally divides the co-routine across the sub-routines 116. The yield statements are handled by registering the sub-routines 116 to execute for a corresponding event. In some embodiments, the listing 10 is identical to the listing 9, except for a registered sub-routine remains same. The co-routines 110 may have yield statements inside conditional statements such as if-else or switch-case.

Listing 11: Co-routine with if-else

```
int co_function0(void)
{
    int i = 0;                                  // (1)
    i = sub_functionA(i);
    i++;                                        // (2)
    if (i == 10) {
        i = sub_functionB(i);                   // (3)
        wait(ev_Event0);                        // (4)
        i = sub_functionB(i+1);                 // (5)
    } else {
        i = sub_functionB(i);                   // (6)
        wait(ev_Event1);                        // (7)
        i = sub_functionB(i+2);                 // (8)
    }
    i = sub_functionC(i);                       // (9)
    wait(ev_Event2);                            // (10)
    return (i+10);                              // (11)
}
```

In some embodiments, a Listing 12 is disclosed, The Listing 12 transforms at least one of co-routine persistent values, a co-routine return value and co-routine simple yield statements.

Listing 12: Handling Conditional Yield Statements

```
status_t sub_function0( )
{
    int i = 0;                                  // (1)
    i = sub_functionA(i);
    i++;                                        // (2)
    if (i == 10) {
        i = sub_functionB(i);                   // (3)
        trigger_on(ev_Event0, sub_function1, i);// (4)
        return DEFFERED;
```

Listing 12: Handling Conditional Yield Statements

```
    } else {
        i = sub_functionB(i);                   // (6)
        trigger_on(ev_Event1, sub_function2, i);// (7)
        return DEFFERED;
    }
}
status_t sub_function1(int i)
{
    i = sub_functionB(i+1);                     // (5)
    return sub_function3(i);
}
status_t sub_function2(int i)
{
    i = sub_functionB(i+2);                     // (8)
    return sub_function3(i);
}
status_t sub_function3(int i)
{
    i = sub_functionC(i);                       // (9)
    trigger_on(ev_Event2, sub_function4, i);    // (10)
    return DEFFERED;
}
status_t sub_function4(int i)
{
    return_value(i+10);                         // (11)
    return DONE;
}
```

In some embodiments, an expressing behaviour using co-routine semantics is very convenient for the cases where the execution needs to wait for events that are triggered externally to the behaviour. In some embodiments, the co-routine semantics may not be supported in certain environments. In some embodiments, the source to source transformation unit 204 allows the user 202 to use the co-routine semantics for describing the behaviour of the co-routines 110, while still being able to address cases where the co-routines 110 are not supported or supported but has other disadvantages such as embedded systems and hardware modelling languages.

Figure 6:
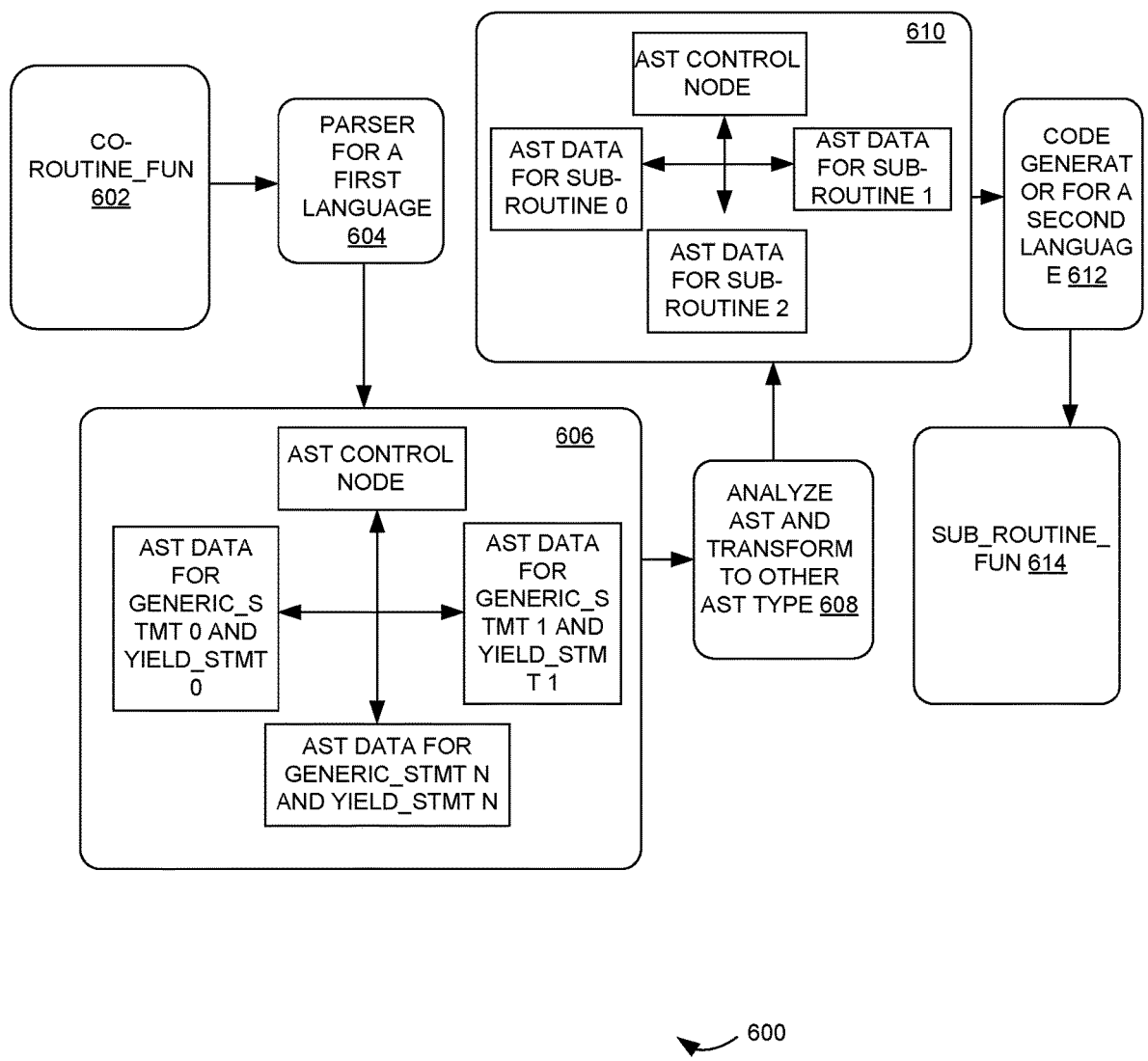
FIG. 6 is a flow chart that illustrates a method for transforming a co-routine function into a sub-routine function using an abstract syntax tree according to some embodiments herein.

FIG. 6 is a flow chart that illustrates a process 600 for transforming a co-routine function into a sub-routine function using an abstract syntax tree according to some embodiments herein. At step 602, the process 600 includes a co-routine_fun. At step 604, the process 600 includes parsing the co-routine_fun for the second language. At step 606, the process 600 includes representing at least one generic statement and at least one yield statement in an abstract syntax tree. At step 608, the process 600 includes analysing the abstract syntax tree of the at least one generic statement and the at least one yield statement. At step 610, the process 600 includes converting the abstract syntax tree of the at least one generic statement and the at least one yield statement into an abstract syntax tree for at least one sub-routine. At step 614, the process 600 includes providing a sub-routine function for the generated code in the first language.

Figure 7:
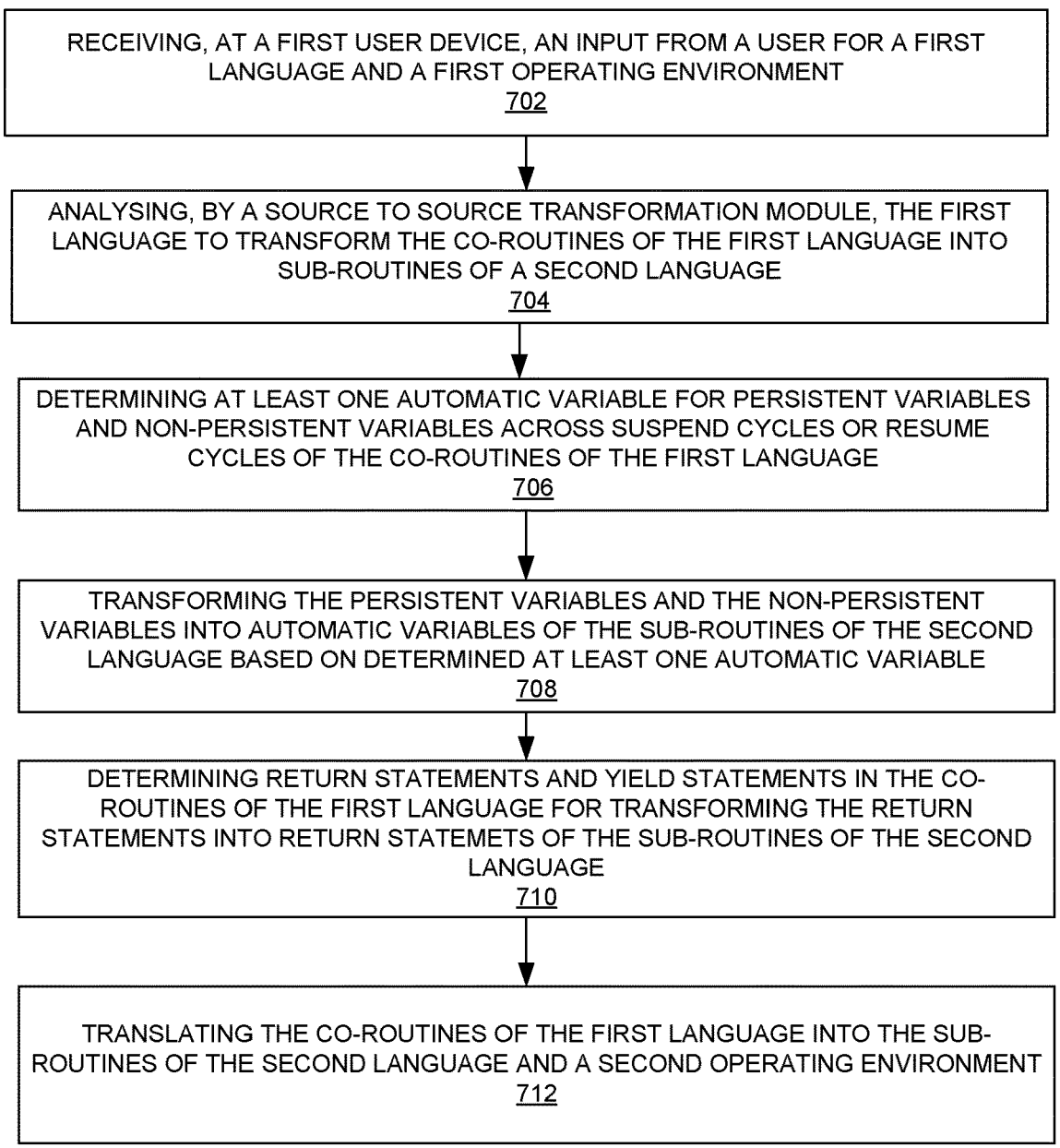
FIG. 7 is a flow chart that illustrates a method for transforming co-routines to equivalent sub-routines according to some embodiments herein.

FIG. 7 is a flow chart that illustrates a method 700 for transforming co-routines to equivalent sub-routines according to some embodiments herein. At step 702, the method 700 includes receiving, at the first user device 102, an input from a user 202 for a first language and the first operating environment 108. The first language includes the co-routines 110. The first language is supported by the first hardware environment 106. At step 704, the method 700 includes analyzing, by the source to source transformation module 204, the first language to transform the co-routines 110 of the first language into sub-routines 116 of a second language for implementing the co-routines 110 of the first language in the second hardware environment 112. The second hardware environment 112 supports the sub-routines 116 of the second language in the second operating environment 114. At step 706, the method 700 includes determining at least one automatic variable for persistent variables and non-persistent variables across suspend cycles or resume cycles of the co-routines 110 of the first language. At step 708, the method 700 includes transforming the persistent variables and the non-persistent variables into automatic variables of the sub-routines 116 of the second language based on determined at least one automatic variable. At step 710, the method 700 includes determining return statements and yield statements in the co-routines 110 of the first language for transforming the return statements and the yield statements into return statements of the sub-routines 116 of the second language. At step 712, the method 700 includes translating the co-routines 110 of the first language into the sub-routines 116 of the second language and the second operating environment 114.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
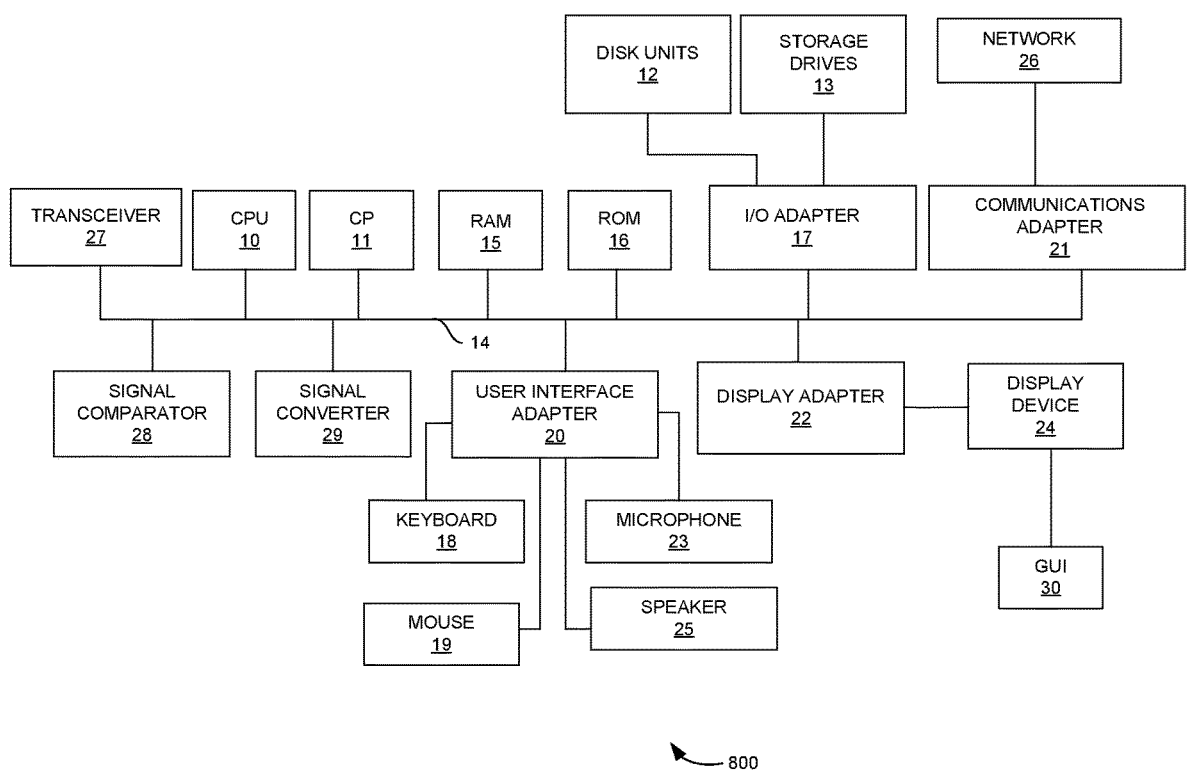
FIG. 8 is a block diagram of a schematic diagram of a device used in accordance with embodiments herein.

A representative hardware environment for practicing the embodiments herein is depicted in FIG. 8, with reference to FIGS. 1 through 7. This schematic drawing illustrates a hardware configuration of the first user device 102 in accordance with the embodiments herein. The first user device 102 includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The first user device 102 can read the inventive instructions on the program storage devices and follow these instructions to execute the methodology of the embodiments herein. The first user device 102 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for transforming co-routines of a first language to equivalent sub-routines of a second language, the method comprising:
    receiving, at a first user device an input from a user for the first language and a first operating environment, wherein the first language comprises the co-routines, wherein the first language is supported in a first hardware environment; and
    analyzing, by a source to source transformation module, the first language to transform the co-routines of the first language into the sub-routines of the second language for implementing the co-routines of the first language in a second hardware environment, wherein the second hardware environment supports the sub-routines of the second language in a second operating environment by determining at least one automatic variable for persistent variables and non-persistent variables across suspend cycles or resume cycles of the co-routines of the first language;

transforming the persistent variables and the non-persistent variables into automatic variables of the sub-routines of the second language based on determined at least one automatic variable;

determining return statements and yield statements in the co-routines of the first language for transforming the return statements of the co-routines of the first language into return statements of the sub-routines of the second language; and translating the co-routines of the first language into the sub-routines of the second language and the second operating environment.

2. The processor-implemented method of claim 1, wherein the co-routines of the first language are translated into the sub-routines of the second language using at least one of (i) the persistent variables, (ii) the non-persistent variables, (iii) the return statements, and (iv) the yield statements of the co-routines of the first language.

3. The processor-implemented method of claim 1, wherein the first language is a first set of instructions that generates at least one first output in the first operating environment.

4. The processor-implemented method of claim 1, wherein a sub-routine is declared globally in the second language.

5. The processor-implemented method of claim 1, wherein the yield statements in the co-routines of the first language are directly or indirectly inside a loop or conditional.

6. The processor-implemented method of claim 1, wherein the second language is a second set of instructions that generates at least one second output in the second operating environment.

7. The processor-implemented method of claim 1, wherein the co-routines of the first language with the return statements comprise output arguments.

8. The processor-implemented method of claim 1, wherein the method comprises providing an access of the persistent variables and the non-persistent variables to the automatic variables of the sub-routines of the second language.

9. The processor-implemented method of claim 1, wherein the method comprises generating status and return values for each sub-routine of the second language.

10. The processor-implemented method of claim 1, wherein the method comprises storing the at least one automatic variable in a database or a file for using in the sub-routines of the second language.

11. A system for transforming co-routines of a first language to equivalent sub-routines of a second language, the system comprising:
one or more processors;
a source to source transformation module; and
one or more non-transitory computer-readable mediums storing one or more sequences of instructions, which when executed by the one or more processors, cause:
receive, at a first user device, an input from a user in the first language and a first operating environment, wherein the first language comprises the co-routines, wherein the first language is supported in a first hardware environment; and
analyse, by the source to source transformation module, the first language by the processor to transform the co-routines of the first language into the sub-routines of the second language for implementing the co-routines of the first language in a second hardware environment, wherein the second hardware environment supports the sub-routines of the second language in a second operating environment by
determining at least one automatic variable for persistent variables and non-persistent variables across suspend cycles or resume cycles of the co-routines of the first language;
transforming the persistent variables and the non-persistent variables into automatic variables of the sub-routines of the second language based on determined at least one automatic variable;
determining return statements and yield statements in the co-routines of the first language by the processor for transforming the return statements of the co-routines of the first language into return statements of the sub-routines of the second language; and
translating the co-routines of the first language into the sub-routines of the second language and the second operating environment.

12. The system of claim 11, wherein the co-routines of the first language are translated into the sub-routines of the second language using at least one of (i) the persistent variables, (ii) the non-persistent variables, (iii) the return statements, and (iv) the yield statements of the co-routines of the first language.

13. The system of claim 11, wherein the first language is a first set of instructions that generates at least one first output and the first operating environment.

14. The system of claim 11, wherein a sub-routine is declared globally in the second language.

15. The system of claim 11, wherein the yield statements in the co-routines of the first language are directly or indirectly inside a loop or conditional.

16. The system of claim 11, wherein the instructions cause the one or more processors to provide access of the persistent variables and the non-persistent variables to the automatic variables of the sub-routines of the second language.

17. The system of claim 11, wherein the instructions cause the one or more processors to generate status and return values for each sub-routine of the second language.

18. The system of claim 11, wherein the instructions cause the one or more processors to store the at least one automatic variable in a database or a file for using in the sub-routines of the second language.

* * * * *